United States Patent
Higashiura et al.

[11] Patent Number: 5,868,420
[45] Date of Patent: Feb. 9, 1999

[54] SIDE IMPACT AIR BAG APPARATUS AND DOOR ARM REST

[75] Inventors: Takuya Higashiura; Mutsumu Haraoka, both of Toyota, Japan

[73] Assignee: Toyota Jidosha Kabushiki Kaisha, Toyota, Japan

[21] Appl. No.: 748,919

[22] Filed: Nov. 15, 1996

[30] Foreign Application Priority Data

Nov. 30, 1995 [JP] Japan .................................. 7-312440

[51] Int. Cl.⁶ .................................................. B60R 21/22
[52] U.S. Cl. ................................... 280/730.2; 280/743.1
[58] Field of Search ............................. 280/730.2, 743.1, 280/751

[56] References Cited

U.S. PATENT DOCUMENTS

| | | | |
|---|---|---|---|
| 3,989,275 | 11/1976 | Finch et al. | 280/751 |
| 4,783,114 | 11/1988 | Welch | 280/751 |
| 5,224,723 | 7/1993 | Warner et al. | 280/730.2 |
| 5,348,342 | 9/1994 | Haland et al. | 280/730.2 |
| 5,425,552 | 6/1995 | Linder | 280/743.1 |
| 5,482,344 | 1/1996 | Walker et al. | 280/751 |
| 5,570,900 | 11/1996 | Brown | 280/730 |
| 5,615,915 | 4/1997 | Magoteaux | 280/743.1 |
| 5,667,243 | 9/1997 | Fisher et al. | 280/743.1 |

FOREIGN PATENT DOCUMENTS

| | | |
|---|---|---|
| 5-016751 | 1/1993 | Japan . |
| 5-294194 | 11/1993 | Japan . |
| 6-006124 | 1/1994 | Japan . |
| 7-228213 | 8/1996 | Japan . |

*Primary Examiner*—Kenneth R. Rice
*Attorney, Agent, or Firm*—Pillsbury Madison & Sutro LLP

[57] ABSTRACT

The present invention is a side impact air bag apparatus which is incorporated into a vehicle seat and is mounted to an outer side of a side portion of a seat back frame of the vehicle seat, comprising: an air bag body which is provided in the air bag apparatus and which is rectangular when viewed in the transverse direction of the vehicle in an unfolded state, an unfolding direction distal end lower portion of the air bag body, which is provided at a distal end of the air bag body in the unfolding direction of the air bag body and at a lower side portion of the distal end portion, being folded in a diagonally upward direction of the vehicle, and thereafter, the air bag body being folded from the distal end side of the air bag body in the unfolding direction of the air bag body to a proximal end side of the air bag body in the unfolding direction of the air bag body.

17 Claims, 14 Drawing Sheets

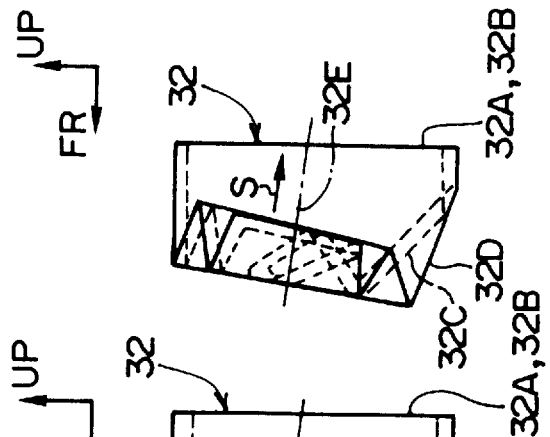
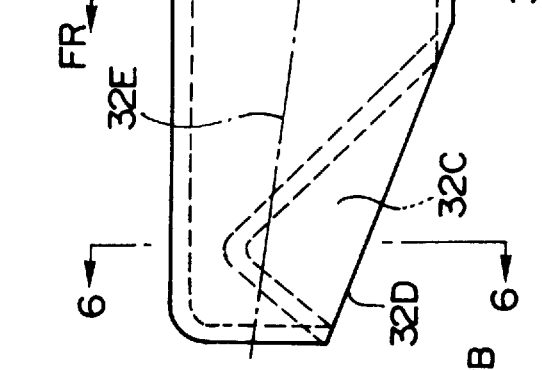
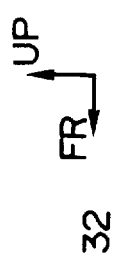
FIG. 5A  FIG. 5B  FIG. 5C

FIG. 8
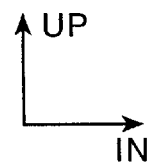
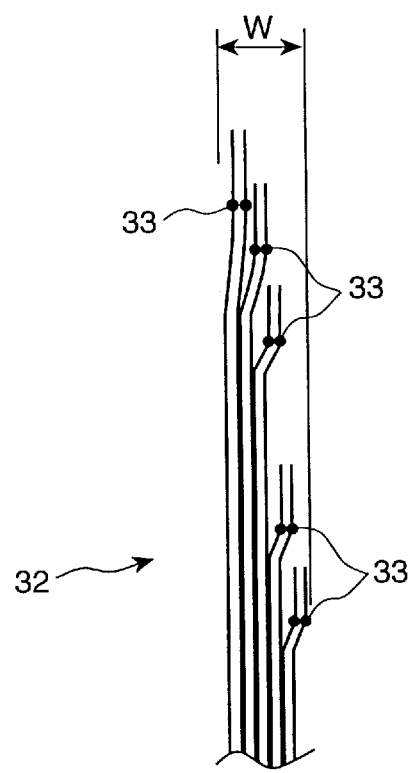

SIDE IMPACT AIR BAG APPARATUS AND DOOR ARM REST

BACKGROUND OF THE INVENTION

1. Field of the Invention

The present invention relates to a side impact air bag apparatus and a door arm rest, and more particularly to a side impact air bag apparatus which is mounted to an outer side of a side portion of a seat back frame of a vehicle seat, and to a vehicle door arm rest at which the side impact air bag is disposed.

2. Description of the Related Art

As a conventional side impact air bag apparatus for a vehicle, Japanese Utility Model Application Laid-Open (JP-U) No. 6-6124 discloses an air bag main body which is folded over in a triangular shape along a diagonal line connecting a front end lower corner of the air bag main body and a back end upper corner thereof, and thereafter, is accordion folded (i.e., folded into a bellows-like shape) so as to be accommodated within a door trim. Japanese Patent Application Laid-Open (JP-A) No. 5-294194 discloses an air bag main body which is accordion folded from both end portions of the air bag main body in the longitudinal direction of the vehicle to the center thereof, and thereafter, is rolled up from one of the vertical directions of the vehicle so as to be accommodated within a door trim. Japanese Patent Application Laid-Open (JP-A) No. 5-16751, U.S. Pat. No. 5,224,732 and Japanese Patent Application Laid-Open (JP-A) No. 7-228213 disclose a method of folding an air bag main body which is accommodated within a door trim. Further, as a conventional side impact air bag apparatus for a vehicle, an air bag apparatus is mounted to an outer side of a side portion of a seat back frame. When an external force is applied to the side of the vehicle, an air bag body is unfolded between an inner portion of the vehicle (i.e., the portion of the door which opposes the vehicle compartment) and a side portion of the occupant. An example of such side impact air bag apparatus is shown in U.S. Pat. No. 5,348,342.

As illustrated in FIG. 14, in this side impact air bag apparatus, an air bag body 94 and an inflator 92 are accommodated within an unillustrated air bag case, which is mounted to an outer side of a side portion of an unillustrated seat back frame of a seat 90.

The air bag body 94 is rectangular when viewed from the side of the vehicle in an unfolded state, and is accommodated within the air bag case in a folded state. When the inflator operates, the air bag body 94 is unfolded as shown in FIG. 14. The air bag body 94 interposes between the occupant seated in the seat 90 and a wall portion at the vehicle compartment side so as to protect the occupant's chest from the impact of the vehicle.

However, in this side impact air bag apparatus, there is a case in which the occupant is seated in a state in which a seat back 90A of the seat 90 is moved from a reference position (a position shown by a solid line in FIG. 14) to a position (a position shown by an imaginary line in FIG. 14) at which the seat 90 is inclined forwardly. In this case, as illustrated by the imaginary line in FIG. 14, an unfolding direction distal end lower portion 94A of the unfolded air bag body 94 and a rear end portion 96A of a door arm rest 96, which protrudes to an inner surface of a door (i.e., the portion of the door which opposes the vehicle compartment), overlap when viewed from the side of the vehicle. As a result, in a case in which the air bag body 94 is pressed by the occupant and the door arm rest 96, local load is applied to the unfolding direction distal end lower portion 94A of the air bag body 94.

SUMMARY OF THE INVENTION

With the aforementioned in view, an object of the present invention is to provide a side impact air bag apparatus and a door arm rest in which local load does not act on an unfolded air bag body due to the door arm rest.

A first aspect of the present invention is a side impact air bag apparatus which is incorporated into a vehicle seat and is mounted to an outer side of a side portion of a seat back frame of the vehicle seat, comprising: an air bag body which is provided in the air bag apparatus and which is rectangular when viewed in the transverse direction of the vehicle in an unfolded state, an unfolding direction distal end lower portion of the air bag body, which is provided at a distal end of the air bag body in the unfolding direction of the air bag body and at a lower side portion of the distal end portion, being folded in a diagonally upward direction of the vehicle, and thereafter, the air bag body being folded from the distal end side of the air bag body in the unfolding direction of the air bag body to a proximal end side of the air bag body in the unfolding direction of the air bag body.

In accordance with the first aspect of the present invention, in the initial stages of the unfolding of the air bag body, the unfolding direction distal end lower portion of the air bag body, which has been folded in the diagonally upward direction of the vehicle, is unfolded later than the other portions of the air bag body. As a result, the unfolding direction distal end lower portion of the air bag body is unfolded while pressing a door arm rest from above. Further, a superior effect is achieved in that local load does not act on the unfolded air bag body due to the door arm rest.

A second aspect of the present invention is a door arm rest for a vehicle in which a side impact air bag apparatus is mounted to an outer side of a side portion of a seat back frame, comprising: a low rigidity portion which, when viewed in the transverse direction of the vehicle, is provided at a portion of the door arm rest overlapping with an unfolded air bag body such that rigidity of the low rigidity portion is lower than the rigidity of the other portion of the door arm rest.

In accordance with the second aspect of the present invention, if the air bag body is unfolded so as to overlap with the door arm rest when viewed from the side of the vehicle and the load applied by the door arm rest acts on the area in which the air bag body overlaps with the door arm rest, the low rigidity portion deforms. Further, a superior effect is achieved in that the local load does not act on the unfolded air bag body due to the door arm rest.

A third aspect of the present invention is a door arm rest, according to the second aspect of the present invention, wherein the low rigidity portion is provided such that an interior portion of the low rigidity portion is hollow.

In accordance with the third aspect of the present invention, if the air bag body is unfolded so as to overlap with the door arm rest when viewed from the side of the vehicle and the load applied by the door arm rest acts on the area in which the air bag body overlaps with the door arm rest, the low rigidity portion whose inner side is hollow is crushed. Further, with a simple structure, a superior effect is achieved in that local load does not act on the unfolded air bag body due to the door arm rest.

BRIEF DESCRIPTION OF THE DRAWINGS

FIG. 5A is a side view which shows an order for folding the air bag body of the side impact air bag apparatus relating to the first embodiment of the present invention.

FIG. 5B is a side view which shows the order for folding the air bag body of the side impact air bag apparatus relating to the first embodiment of the present invention.

FIG. 5C is a side view which shows the order for folding the air bag body of the side impact air bag apparatus relating to the first embodiment of the present invention.

FIG. 8 is a cross-sectional view taken along a line 8—8 of FIG. 7.

DESCRIPTION OF THE PREFERRED EMBODIMENTS

A first embodiment of a side impact air bag apparatus of the present invention will be described in accordance with FIGS. 1 through 8.

In all of the drawings, arrow FR denotes a forward direction of a vehicle; arrow UP indicates an upward direction of the vehicle; and arrow IN denotes an inward direction of the vehicle in the transverse direction thereof.

Figure 1:
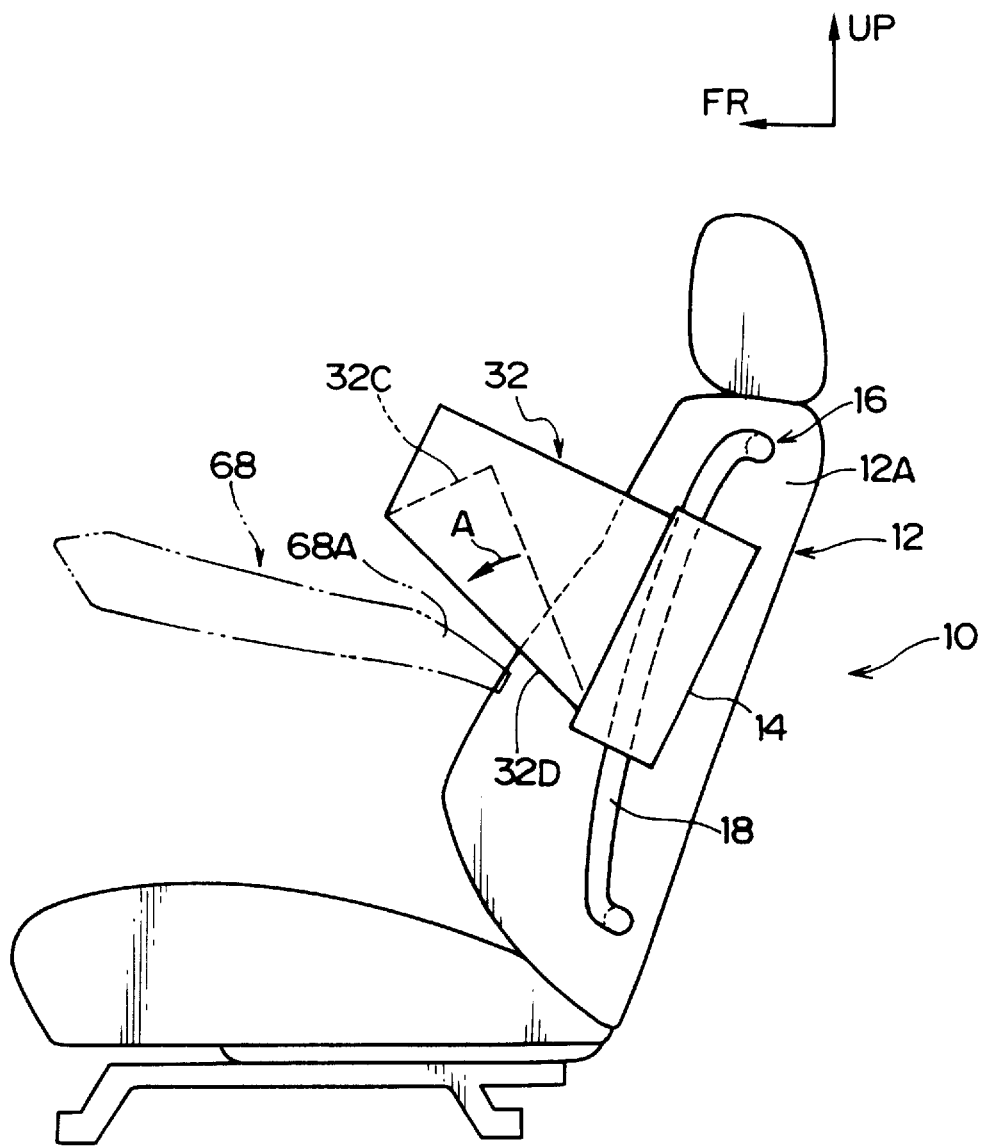
FIG. 1 is a schematic side view which shows a side impact air bag apparatus relating to a first embodiment of the present invention.

As illustrated in FIG. 1, in the side impact air bag apparatus of the first embodiment, a side impact air bag apparatus 14 is incorporated into a side portion 12A, which is formed at the outer side of a seat back 12 of a seat 10 in the transverse direction of the vehicle.

Figure 4:
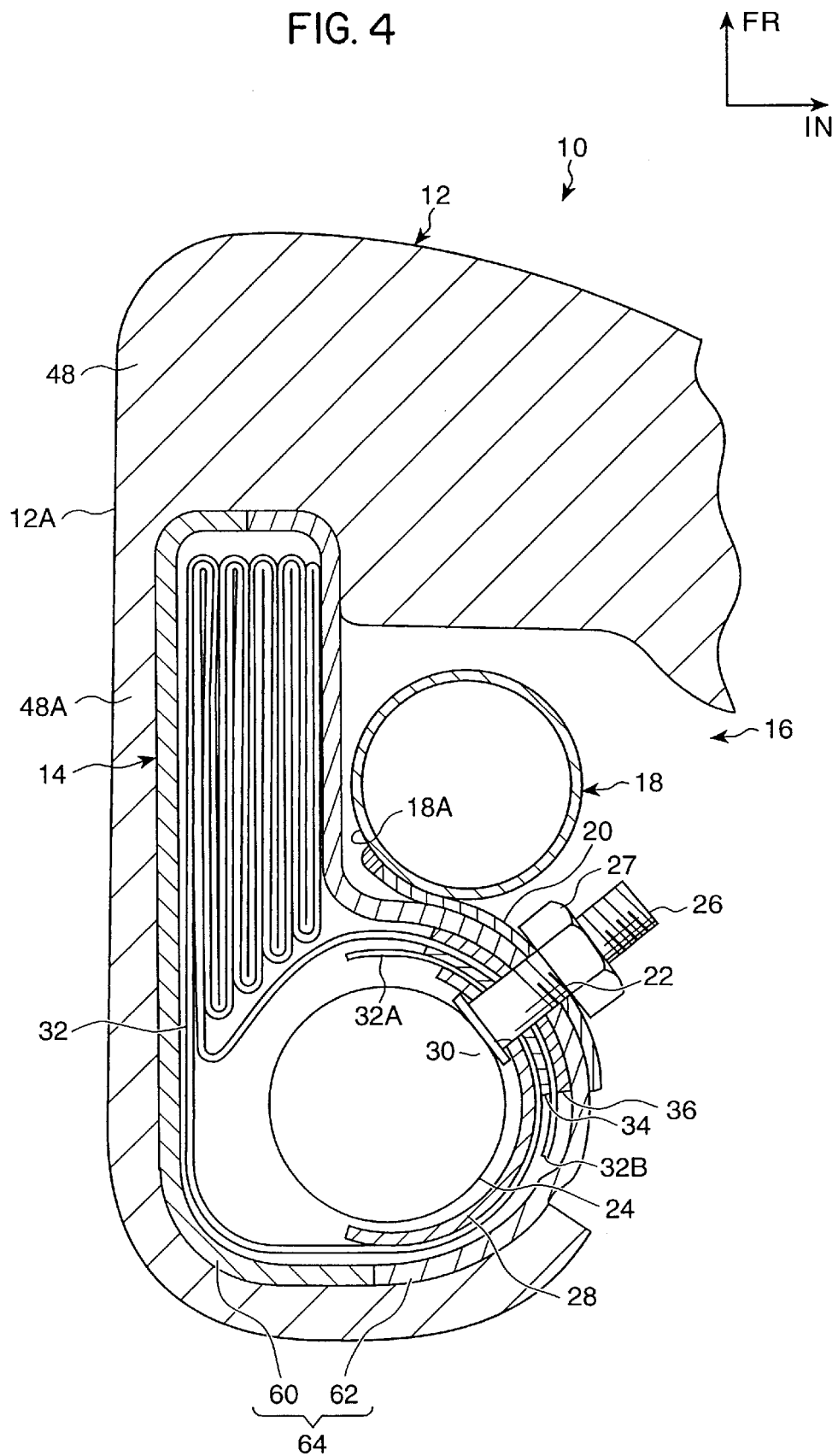
FIG. 4 is a plan sectional view which shows a state in which an air bag body of the side impact air bag apparatus relating to the first embodiment of the present invention is accommodated.

As illustrated in FIG. 4, a seat bracket 20 is welded to an outer circumferential surface 18A of a side frame 18, which forms a side portion of a seat back frame 16. Two through-holes 22 for mounting the air bag apparatus 14 to the seat back frame 16 are punched at the seat bracket 20 at a predetermined interval along the longitudinal direction of the seat back 12.

A stud bolt 26 is inserted through the through-hole 22 substantially toward the front portion of the transverse direction inner side of the seat (i.e., from the lower left toward the upper right in FIG. 4) The stud bolt 26 is caulked to an outer peripheral portion of a diffusion plate 28 of the air bag apparatus 14 at a predetermined interval and fixed to the seat bracket 20 by a nut 27. A lengthwise direction central portion of the diffusion plate 28 is formed in a cylindrical shape. The diffusion plate 28 is disposed along the longitudinal direction of the seat back 12 and fixed by caulking to the outer circumferential portion of a cylindrical-shaped gas inflator 24. A portion of the diffusion plate 28 other than the central portion thereof is located at an inner direction of the seat back 12, and the cross-sectional configuration thereof is substantially semicircular.

Therefore, gas is injected from the outer circumferential portion of the gas inflator 24 directed outwardly in the radial direction thereof. The gas, which has been injected in the inward direction of the seat back 12, is directed by the diffusion plate 28 in the outward direction of the seat back 12, i.e., the direction of an air bag body 32. A through-hole 30 for caulking the stud bolt 26 to the diffusion plate 28 is punched thereat.

Open edge portions 32A and 32B of the air bag body 32 are held between the diffusion plate 28 and the seat bracket 20. A reinforcing cloth 34 is held between the open edge portions 32A and 32B, and a reinforcing cloth 36 is held between the open edge portion 32B and the seat bracket 20. The reinforcing cloth 34 is sewn on an outer peripheral surface of the open edge portion 32A, and the reinforcing cloth 36 is sewn on an outer peripheral surface of the open edge portion 32B. Accordingly, the open edge portions 32A and 32B of the air bag body 32 are sealed such that gas is not leaked therefrom.

Through-holes, through which the stud bolt 26 has been inserted, are punched at the open edge portions 32A and 32B of the air bag body 32 and the reinforcing cloths 34 and 36.

Moreover, the air bag apparatus 14 includes an air bag case 64 formed by a lid 60, which is unfolded when the air bag body 32 is unfolded, and a base 62, which is fixed to the side frame 18 via the seat bracket 20. The air bag case 64 is integrally formed in a seat back pad 48. The outer portion of the lid 60 is covered by a side portion 48A of the seat back pad 48. The air bag case 64 may be separately formed from the seat back pad 48.

As illustrated in FIG. 5A, the air bag body 32 is rectangular whose widthwise direction is the vertical direction of the vehicle and whose lengthwise direction is the longitudinal direction of the vehicle. By superposing one cloth on the other and sewing together the outer peripheral portions of the cloths other than one end portions (the open edge portions 32A and 32B) in the lengthwise direction of the air bag body 32, the air bag body 32 becomes a bag body having an open portion.

Next, a method of folding the air bag body 32 will be described.

Figure 6:
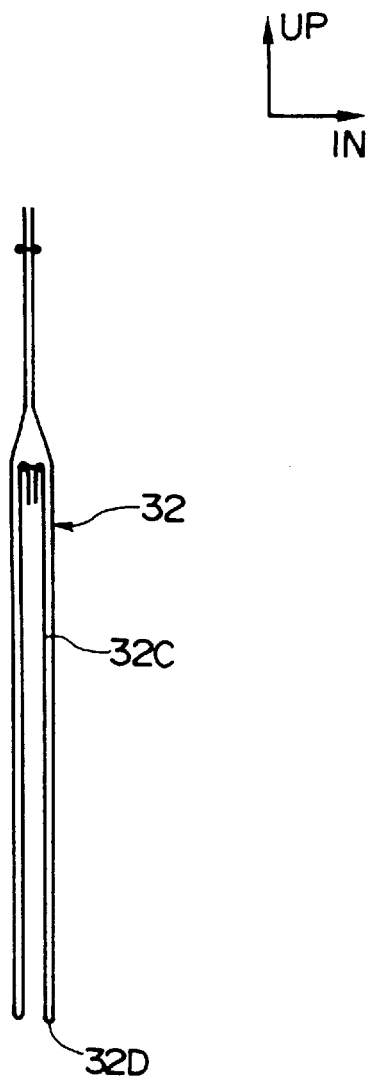
FIG. 6 is a cross-sectional view taken along a line 6—6 of FIG. 5B.
Figure 7:
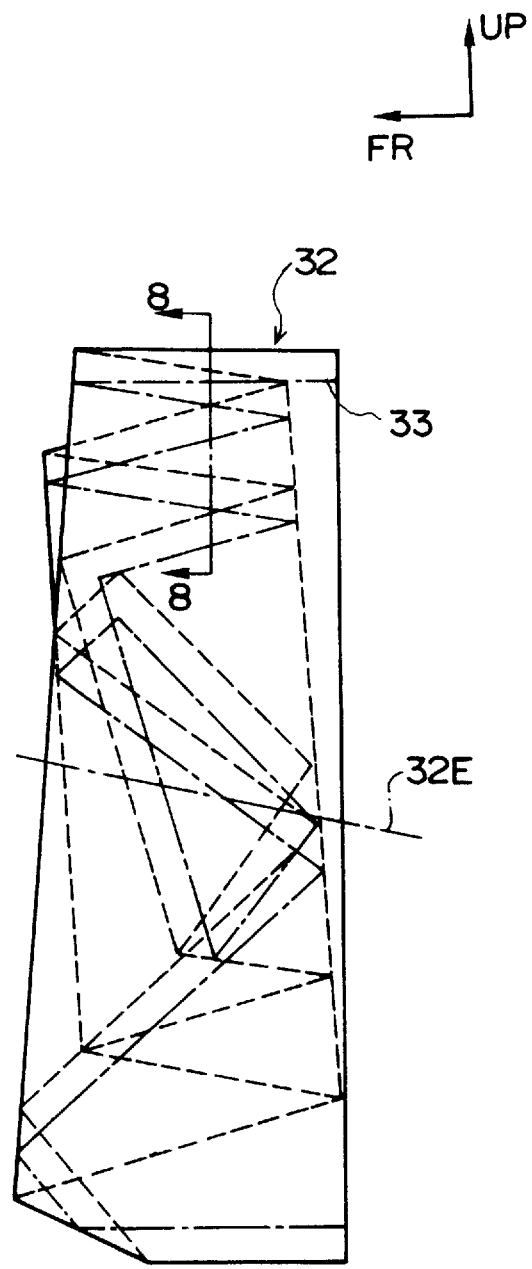
FIG. 7 is a side view which shows a state in which the air bag body of the side impact air bag apparatus relating to the first embodiment of the present invention is folded.

As illustrated in FIG. 5A, an unfolding direction distal end lower portion 32C of the air bag body 32 (hereinafter, "distal end lower portion 32C") is at first folded along a bend line 32D diagonally upward so as to protrude towards an inner side of the air bag body 32. The state of the air bag body 32 after the distal end lower portion 32C has been folded in this way is shown in FIGS. 5B and 6. Therefore, as illustrated in FIG. 1, even if the seat back 12 is at a position in which the seat back 12 is inclined forwardly at a predetermined angle from a reference position, the distal end lower portion 32C in this folded state is in a range in which a rear end portion 68A of a door arm rest 68 and the air bag body 32 do not interfere with each other. Next, as illustrated in FIG. 5C, the air bag body 32 whose distal end lower portion 32C has been folded is accordion folded in a direction substantially along a center line 32E of the air bag body 32 in the direction (the direction of arrow S) from the distal end side of the air bag body 32 in the unfolding direction thereof to the proximal end side of the air bag body 32 in the unfolding direction thereof (i.e., the open portion (i.e., unsewn portion) side of the air bag body 32). The state of the air bag body 32 at this time is shown in FIG. 7.

Therefore, the air bag body 32 is unfolded as shown in FIGS. 5C, 5B, and 5A in that order.

As illustrated in FIG. 8, the stitches of the sewing thread 33 do not overlap in the thickness direction of the air bag body 32 when the air bag body 32 is in the folded state. In addition, as illustrated in FIG. 1, an upper surface portion of the rear end portion 68A of the door arm rest 68 is inclined towards the rearward lower direction of the vehicle.

Next, the operation of the first embodiment will be explained.

In the side impact air bag apparatus of the first embodiment, when the gas inflator 24 of the air bag apparatus 14 operates at the time of the side impact, gas is injected from the gas inflator 24 and conveyed to the air bag body 32 so as to unfold and inflate the air bag body 32. Due to this unfolding and inflating force of the air bag body 32, the lid 60 is opened and the air bag body 32 is unfolded at the side of the occupant.

In this case, as illustrated in FIG. 1, the air bag body 32 is at first unfolded in a state in which the distal end lower portion 32C is folded. As a result, even if the seat back 12 is moved from the reference position to the front of the vehicle at a predetermined angle, the air bag body 32 does not interfere with the rear end portion 68A of the door arm rest 68.

Figure 2:
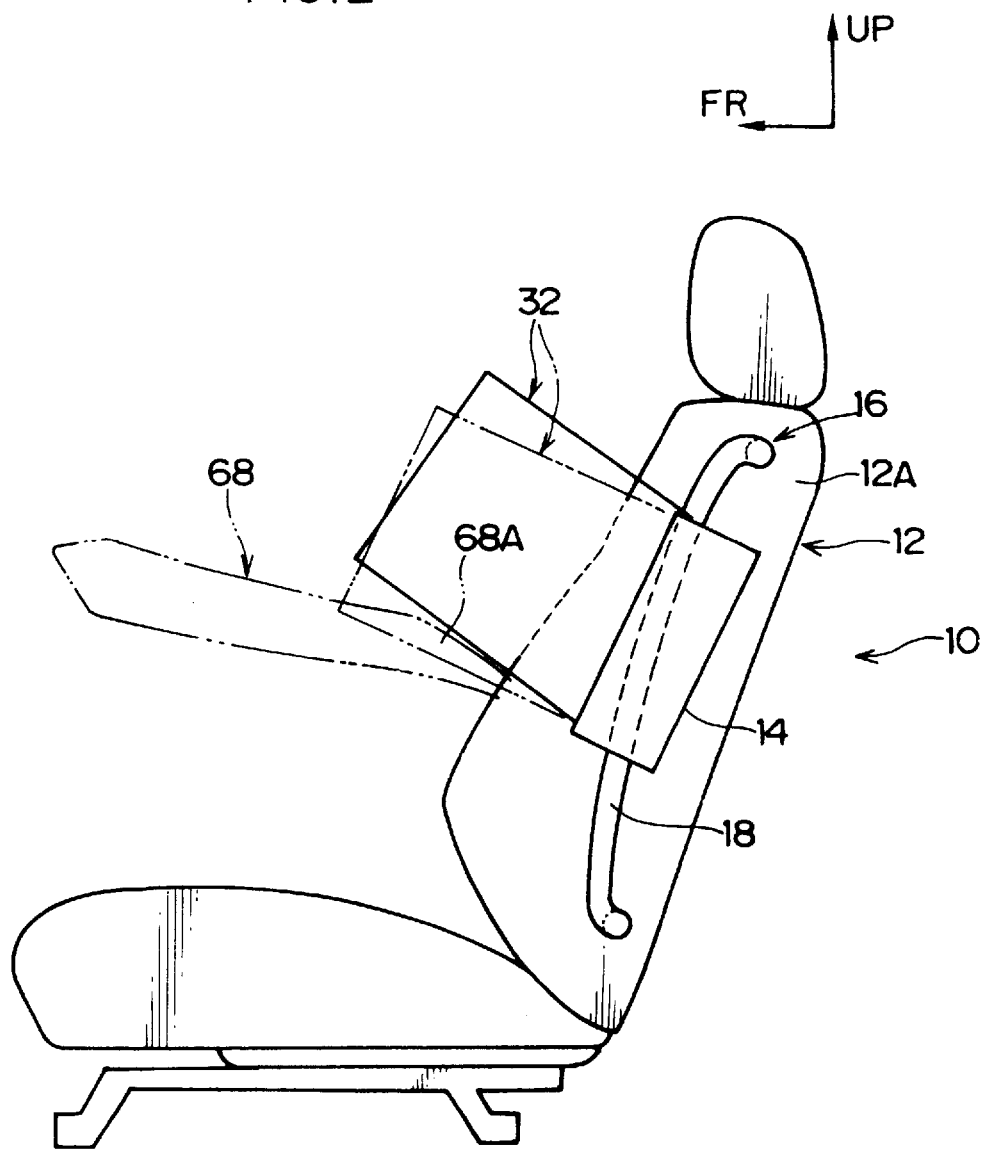
FIG. 2 is a schematic side view which describes an operation of the side impact air bag apparatus relating to the first embodiment of the present invention.

Thereafter, the distal end lower portion 32C is unfolded in the direction (the direction of arrow A in FIG. 1) substantially normal to the bend line 32D. As a result, the distal end lower portion 32C is unfolded while pressing the rear end portion 68A of the door arm rest 68 in the direction of arrow A (substantially downward direction). Accordingly, as illustrated in FIG. 2, when the unfolding of the air bag body 32 is completed, due to the reactive force of the door arm rest 68, the air bag body 32 is moved from a position (a position shown by an imaginary line in FIG. 2) at which the air bag body 32 is originally unfolded to an upper position (a position shown by a solid line in FIG. 2).

Figure 3:
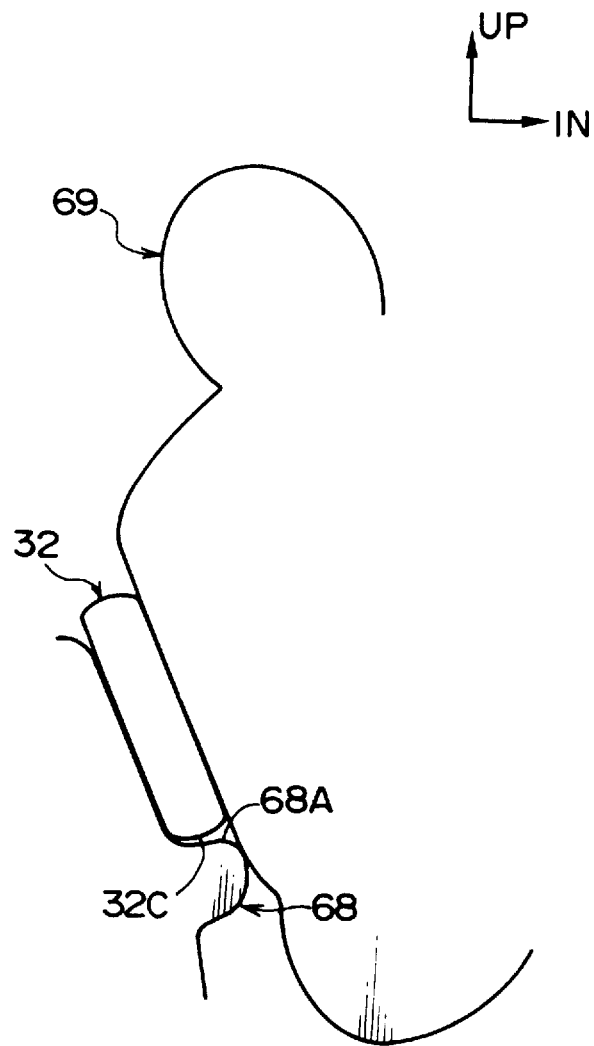
FIG. 3 is a schematic rear view which, seen from the rearward direction of a vehicle, describes the operation of the side impact air bag apparatus relating to the first embodiment of the present invention.

Consequently, as illustrated in FIG. 3, in a state in which the unfolding of the air bag body is completed, the distal end lower portion 32C is disposed above the rear end portion 68A of the door arm rest 68. Therefore, the distal end lower portion 32C is not held between the door arm rest 68 and an occupant 69, and local load does not act on the unfolded air bag body 32.

Moreover, as illustrated in FIG. 8, in the side impact air bag apparatus of the first embodiment, the stitches of the sewing thread 33 do not overlap in the thickness direction of the air bag body 32 when the air bag body 32 is in the folded state. Accordingly, a maximum thickness W can be thinned and accommodation of the air bag body 32 is improved.

Figure 9:
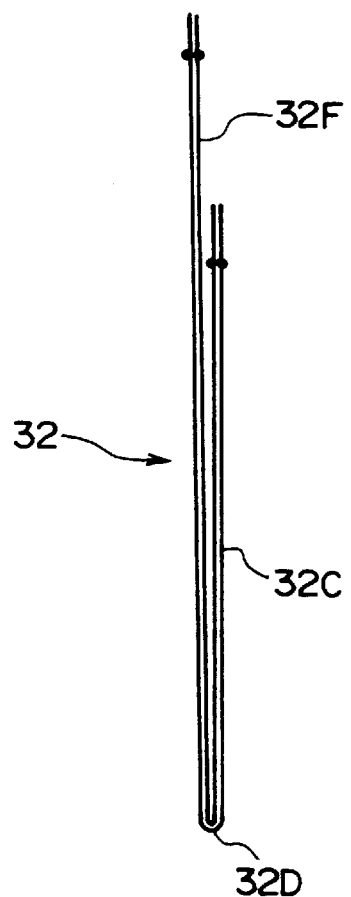
FIG. 9 is a cross-sectional view, which corresponds to FIG. 6, of the side impact air bag apparatus relating to a variant example of the first embodiment of the present invention.

As illustrated in FIG. 6, in the side impact air bag apparatus of the first embodiment, the distal end lower portion 32C is folded so as to protrude towards the inner side of the air bag body 32. However, instead of this, as illustrated in FIG. 9, the air bag body 32 may be folded along the bend line 32D such that the distal end lower portion 32C overlaps with a surface 32F of the air bag body 32 at the door side.

Further, as illustrated in FIG. 5C, in the side impact air bag apparatus of the first embodiment, the air bag body 32 is accordion folded in the direction (the direction of arrow S) from the distal end side of the air bag body 32 in the unfolding direction thereof to the proximal end side (open (unsewn) portion side) of the air bag body 32 in the unfolding direction thereof. The state of the air bag body 32 at this time is shown in FIG. 7. However, instead of this, the air bag body 32 may be folded in the other shape such as in a roll shape from the distal end side of the air bag body 32 in the unfolding direction thereof to the proximal end side of the air bag body 32 in the unfolding direction thereof.

Next, a door arm rest relating to a second embodiment of the present invention will be described in accordance with FIGS. 10 through 12.

Members which are the same as those in the previously-described embodiment are denoted by the same reference numerals, and descriptions thereof are omitted.

Figure 10:
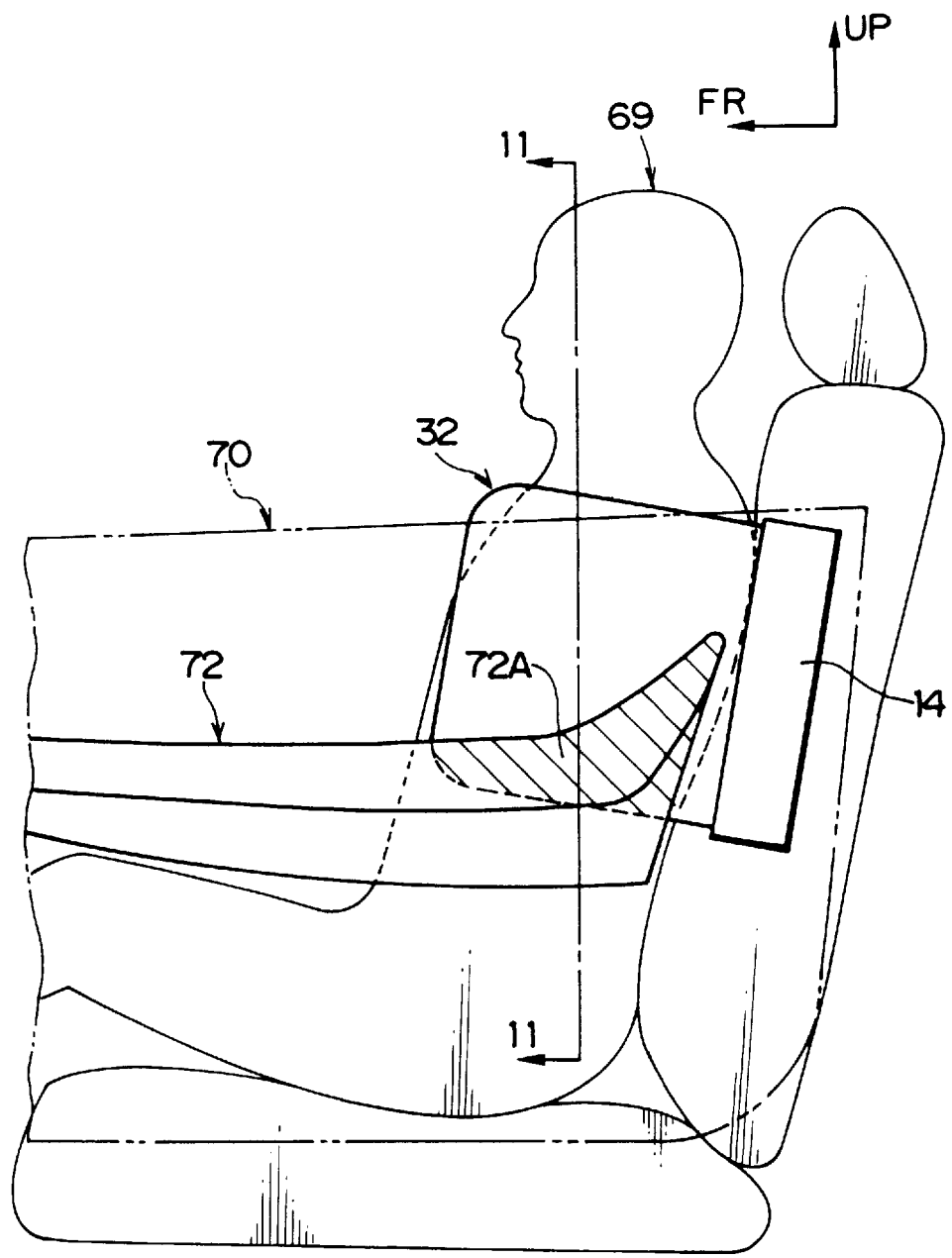
FIG. 10 is a schematic side view which shows a door arm rest relating to a second embodiment of the present invention when the air bag body is in an unfolded state.

As illustrated in FIG. 10, in the second embodiment, a rear end portion of a door arm rest 72 provided at a front side door 70 is extended in the upward direction of the vehicle. A low rigidity portion 72A (a hatched portion in FIG. 10) which overlaps with the air bag body 32 in an unfolded state, when viewed from the side, is formed at the rear end upper portion of the door arm rest 72.

Figure 11:
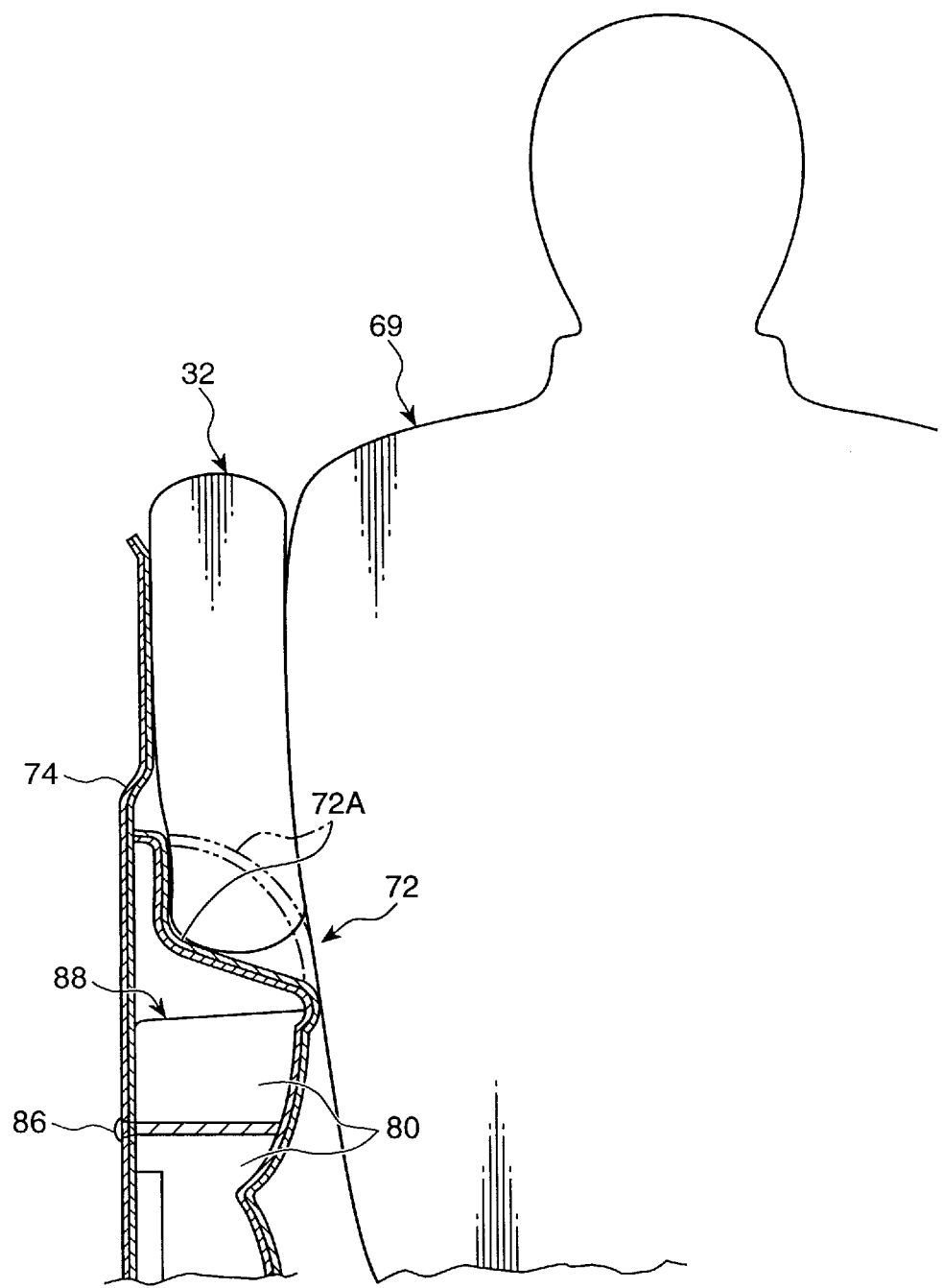
FIG. 11 is a cross-sectional view taken along a line 11—11 of FIG. 10.

As illustrated in FIG. 11, the door arm rest 72 is mounted to the inner surface of the door trim 74 (i.e., the surface of the door trim 74 at the vehicle compartment side) and protrudes toward the occupant 69 side.

Figure 12:
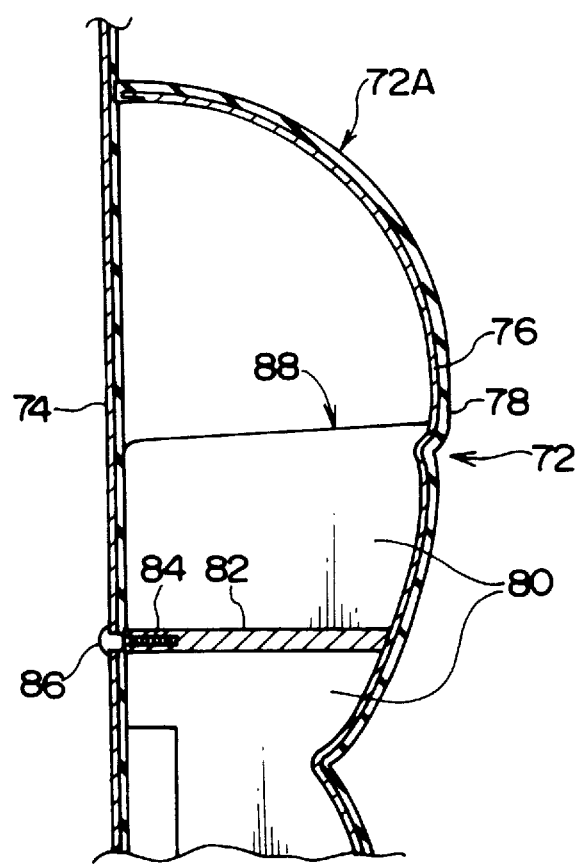
FIG. 12 is a cross-sectional view which shows a low rigidity portion of the door arm rest relating to the second embodiment of the present invention.

As shown in FIG. 12, the door arm rest 72 is formed by an insert 76 and a covering layer 78 which covers a design surface of the insert 76. Ribs 80 are formed from the insert 76 to the door trim 74 at predetermined intervals along the longitudinal direction of the vehicle. A shaft portion 82 which extends from the insert 76 to the door trim 74 is formed at the rib 80. A female screw 84 is formed at an end portion of the shaft portion 82 at the door trim 74 side. A screw 86 is screwed on the female screw 84 from the vehicle outer side of the door trim 74. As a result, the door arm rest 72 is fixed to the door trim 74. Further, in the low rigidity portion 72A of the door arm rest 72, a notch 88 is formed at the rib 80. The interior of the low rigidity portion 72A is hollow.

As in a conventional example, in the second embodiment, the air bag body 32 is accordion folded from the distal end side of the air bag body 32 in the unfolding direction thereof to the open portion side thereof.

Next, the operation of the second embodiment will be explained.

In the second embodiment, as illustrated in FIG. 10, when the air bag apparatus 14 is operated at the time of the side impact, the rectangular-shaped air bag body 32 in a folded state is unfolded between the occupant 69 and the low rigidity portion 72A of the door arm rest 72. When the occupant 69 and the door arm rest 72 relatively move in directions of approaching each other in this state, the low rigidity portion 72A of the door arm rest 72 is pressed by the air bag body 32 and crushed as shown by a solid line in FIG. 11.

Therefore, in the second embodiment, with a simple structure, local load does not act on the unfolded air bag body 32 due to the door arm rest 72.

Figure 13A:
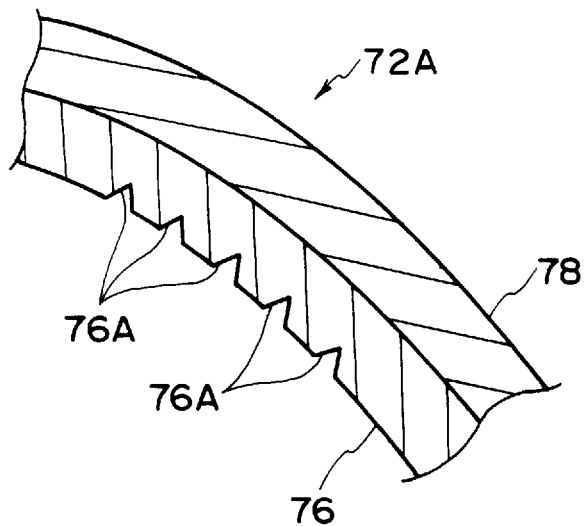
FIG. 13A is an enlarged sectional view of an essential part which shows low rigidity means provided at the low rigidity portion of the door arm rest relating to the second embodiment of the present invention.
Figure 13B:
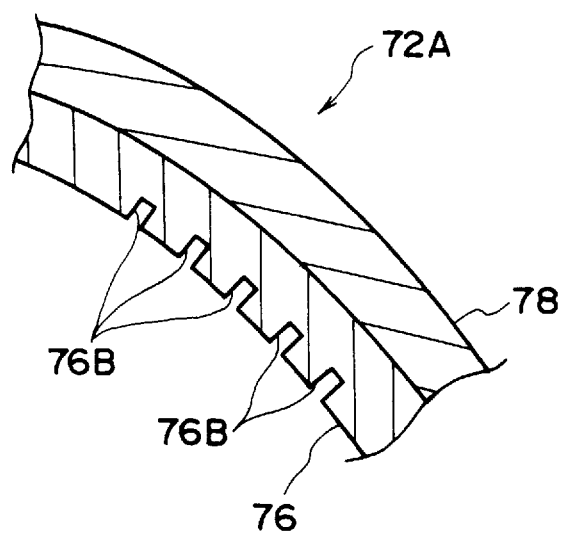
FIG. 13B is an enlarged sectional view of an essential part which shows the low rigidity means provided at the low rigidity portion of the door arm rest relating to the second embodiment of the present invention.
Figure 14:
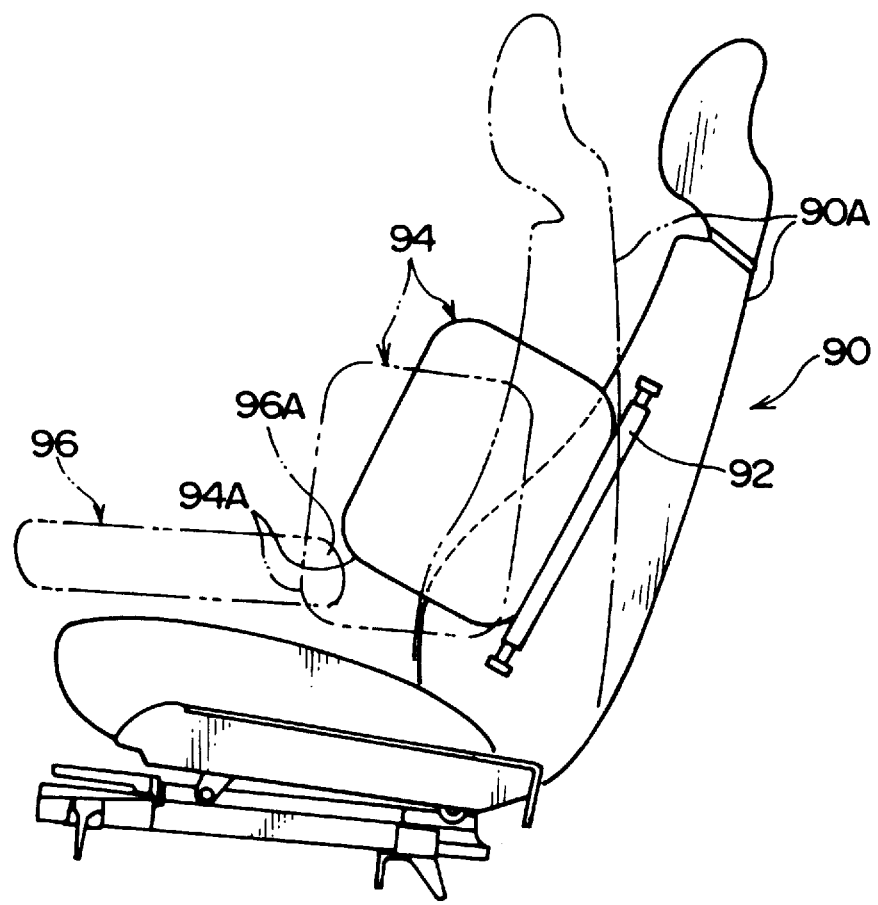
FIG. 14 is a schematic side view which shows a side impact air bag apparatus relating to a conventional example.

In the second embodiment, the interior of the low rigidity portion 72A is hollow. Instead of this, however, as shown in FIGS. 13A and 13B, low rigidity means such as V-shaped grooves (notches) 76A and slits 76B may be formed at a reverse surface (i.e., a surface opposite the surface which faces the covering layer 78) of the insert 76 of the low rigidity portion 72A.

Hereinbefore, the specific embodiments of the present invention have been described in detail. However, it is obvious to those skilled in the art that the present invention is not limited to these embodiments and that various other embodiments are possible within the scope of the present invention.

What is claimed is:

1. A side impact air bag apparatus which is incorporated into a vehicle seat and is mounted to an outer side of a side portion of a seat back frame of the vehicle seat, comprising:

an air bag body which is provided in the air bag apparatus and which is rectangular when viewed in the transverse direction of the vehicle in an unfolded state, an unfolding direction distal end lower portion of said air bag body, which is provided at a distal end of said air bag body in the unfolding direction of said air bag body and at a lower side portion of the distal end portion, being folded in a diagonally upward direction of the vehicle, and thereafter, said air bag body being folded from the distal end side of said air bag body in the unfolding direction of said air bag body to a proximal end side of said air bag body in the unfolding direction of said air bag body.

2. A side impact air bag apparatus according to claim 1, wherein in a state in which said unfolding direction distal end lower portion of said air bag body is folded in a diagonally upward direction of the vehicle, said unfolding direction distal end lower portion of said air bag body is positioned so as to not interfere with a door arm rest.

3. A side impact air bag apparatus according to claim 2, wherein said unfolding direction distal end lower portion of said air bag body is provided such that said unfolding direction distal end lower portion of said air bag body projects toward an inner portion of said air bag body to be folded.

4. A side impact air bag apparatus according to claim 3, wherein after said unfolding direction distal end lower portion of said air bag body has been folded, said air bag body is provided such that said air bag body is accordion folded from the distal end side of said air bag body in the unfolding direction of said air bag body to the proximal end side of said air bag body in the unfolding direction of said air bag body.

5. A side impact air bag apparatus according to claim 4, wherein in a state in which said air bag body is folded, stitches of sewing thread of said air bag body do not overlap in the thickness direction of the air bag body.

6. A side impact air bag apparatus according to claim 3, wherein after said unfolding direction distal end lower portion of said air bag body has been folded, said air bag body is provided such that said air bag body is folded from the distal end side of said air bag body in the unfolding direction of said air bag body to the proximal end side of said air bag body in the unfolding direction of said air bag body.

7. A side impact air bag apparatus according to claim 6, wherein in a state in which said air bag body is folded, stitches of sewing thread of said air bag body do not overlap in the thickness direction of the air bag body.

8. A side impact air bag apparatus according to claim 2, wherein said unfolding direction distal end lower portion of said air bag body is folded along a fold line so as to overlap with said air bag body.

9. A side impact air bag apparatus according to claim 8, wherein after said unfolding direction distal end lower portion of said air bag body has been folded, said air bag body is provided such that said air bag body is accordion folded from the distal end side of said air bag body in the unfolding direction of said air bag body to the proximal end side of said air bag body in the unfolding direction of said air bag body.

10. A side impact air bag apparatus according to claim 9, wherein in a state in which said air bag body is folded, stitches of sewing thread of said air bag body do not overlap in the thickness direction of the air bag body.

11. A side impact air bag apparatus according to claim 8, wherein after said unfolding direction distal end lower portion of said air bag body has been folded, said air bag body is provided such that said air bag body is folded from the distal end side of said air bag body in the unfolding direction of said air bag body to the proximal end side of said air bag body in the unfolding direction of said air bag body.

12. A side impact air bag apparatus according to claim 11, wherein in a state in which said air bag body is folded, stitches of sewing thread of said air bag body do not overlap in the thickness direction of the air bag body.

13. A door arm rest for a vehicle in which a side impact air bag apparatus is mounted to an outer side of a side portion of a seat back frame, comprising:

a low rigidity portion which, when viewed in the transverse direction of the vehicle, is provided at a portion of said door arm rest overlapping with an unfolded air bag body such that a rigidity of said low rigidity portion is lower than a rigidity of the other portion of said door arm rest and said low rigidity portion collapses when the unfolded air bag body presses said low rigidity portion as a result of a vehicle occupant colliding with the unfolded air bag body.

14. A door arm rest according to claim 13, wherein said low rigidity portion is provided such that an interior portion of said low rigidity portion is hollow.

15. A door arm rest according to claim 13, wherein said low rigidity portion is provided at an insert which forms a configuration of said door arm rest.

16. A door arm rest according to claim 15, wherein said low rigidity portion is V-shaped grooves.

17. A door arm rest according to claim 15, wherein said low rigidity portion includes slits.

* * * * *

UNITED STATES PATENT AND TRADEMARK OFFICE
CERTIFICATE OF CORRECTION

PATENT NO. : 5,868,420
DATED : February 9, 1999
INVENTOR(S) : HIGASHIURA, et al.

It is certified that error appears in the above-identified patent and that said Letters Patent is hereby corrected as shown below:

<u>On the Cover Page</u>:

Reads:   item   [56] References Cited

U.S. PATENT DOCUMENTS
"5,224,723   7/1993   Warner et al.....................280/730.2"

item   [56] References Cited

U.S. PATENT DOCUMENTS
--5,224,732   7/1993   Warner et al.....................280/730.2--

Signed and Sealed this

Thirteenth Day of July, 1999

Attest:

Q. TODD DICKINSON

Attesting Officer       Acting Commissioner of Patents and Trademarks